US009506592B2

(12) United States Patent
Turnau, III et al.

(10) Patent No.: US 9,506,592 B2
(45) Date of Patent: Nov. 29, 2016

(54) SUPPLY STOP WITH CONNECTION VERIFICATION

(75) Inventors: William Franklin Turnau, III, Canton, MI (US); Joseph P. Schutte, Westland, MI (US)

(73) Assignee: Brass-Craft Manufacturing Company, Novi, MI (US)

( * ) Notice: Subject to any disclaimer, the term of this patent is extended or adjusted under 35 U.S.C. 154(b) by 788 days.

(21) Appl. No.: 13/293,253

(22) Filed: Nov. 10, 2011

(65) Prior Publication Data

US 2012/0284980 A1    Nov. 15, 2012

Related U.S. Application Data

(63) Continuation-in-part of application No. 12/603,121, filed on Oct. 21, 2009.

(51) Int. Cl.
*F16L 37/14* (2006.01)

(52) U.S. Cl.
CPC .......... *F16L 37/144* (2013.01); *F16L 37/0915* (2016.05); *F16L 2201/20* (2013.01); *Y10T 29/5367* (2015.01)

(58) Field of Classification Search
CPC ............... F16L 37/0915; F16L 37/144; F16L 2201/20; Y10T 29/5367
USPC ............ 251/148, 151, 363; 285/23, 93, 108, 285/110, 111, 112, 305, 307, 310, 317, 319, 285/321, 349, 375, 379; 277/549, 530, 560
See application file for complete search history.

(56) References Cited

U.S. PATENT DOCUMENTS

| 1,440,207 A |   | 12/1922 | Burns |         |
|-------------|---|---------|-------|---------|
| 2,384,360 A | * | 9/1945  | Allen et al. | 285/98 |
| 2,394,715 A | * | 2/1946  | Phillips | 285/98 |
| 2,421,228 A | * | 5/1947  | White | 285/110 |
| 2,973,211 A | * | 2/1961  | Osborn | 285/104 |

(Continued)

FOREIGN PATENT DOCUMENTS

| CN | 1167889 | 12/1997 |
|----|---------|---------|
| CN | 1333865 | 1/2002  |

(Continued)

OTHER PUBLICATIONS

Search Report and Written Opinion mailed on Feb. 8, 2011 for PCT/US2010/053029.

(Continued)

*Primary Examiner* — Matthew W Jellett
(74) *Attorney, Agent, or Firm* — Carlson, Gaskey & Olds, PC

(57) ABSTRACT

An apparatus for assembling or disassembling a pipe in a pipe holder, includes: a washer having a body having an annular portion and an extended portion having central bore passing therethrough, the body made of a memory material; a compression fitting for insertion into the pipe holder, the extended portion fitting in the compression fitting; and, a lock for insertion into the pipe holder. The lock is for moving the compression fitting to deform the annular portion against the holder if inserted to form a seal between the pipe, the compression fitting and the holder. The lock also is for allowing the annular portion to reform and move against the holder if the lock is removed such that the compression fitting may be removed if the lock is removed.

32 Claims, 4 Drawing Sheets

(56) References Cited

U.S. PATENT DOCUMENTS

| | | | |
|---|---|---|---|
| 3,346,008 A * | 10/1967 | Scaramucci | 137/516.29 |
| 3,591,205 A * | 7/1971 | Hamburg | 285/81 |
| 4,000,918 A * | 1/1977 | Reker | 285/93 |
| 4,296,952 A * | 10/1981 | McCracken | 285/98 |
| 4,611,788 A * | 9/1986 | Thomsen | 251/363 |
| 4,991,858 A * | 2/1991 | Abila et al. | 277/606 |
| 5,000,491 A * | 3/1991 | Bartholomew | 285/319 |
| 5,002,315 A * | 3/1991 | Bartholomew | 285/93 |
| 5,232,252 A * | 8/1993 | Bartholomew | 285/108 |
| 5,518,276 A * | 5/1996 | Gunderson | 285/93 |
| 5,803,513 A | 9/1998 | Richardson | |
| 5,971,019 A | 10/1999 | Imai | |
| 6,062,607 A * | 5/2000 | Bartholomew | 285/93 |
| 6,173,999 B1 | 1/2001 | Guest | |
| 6,293,596 B1 | 9/2001 | Kinder | |
| 6,328,344 B1 | 12/2001 | Tozaki et al. | |
| 6,637,779 B2 | 10/2003 | Andre | |
| 6,702,335 B2 | 3/2004 | Bahner et al. | |
| 6,860,523 B2 | 3/2005 | O'Neill et al. | |
| 6,893,051 B1 | 5/2005 | Park et al. | |
| 6,899,354 B2 * | 5/2005 | Lanteigne et al. | 285/108 |
| 6,905,143 B2 | 6/2005 | Klinger et al. | |
| 7,014,220 B2 | 3/2006 | Szabo et al. | |
| 7,029,036 B2 | 4/2006 | Andre | |
| 7,121,592 B2 | 10/2006 | Sazbo et al. | |
| 7,128,347 B2 | 10/2006 | Kerin | |
| 7,232,159 B2 | 6/2007 | O'Neill et al. | |
| 7,300,076 B2 | 11/2007 | Inoue | |
| 7,314,209 B2 | 1/2008 | Pierson | |
| 7,316,425 B2 * | 1/2008 | Poder | 285/93 |
| 7,338,030 B2 | 3/2008 | Brown, III | |
| 7,390,025 B2 | 6/2008 | Pepe et al. | |
| 7,396,053 B2 | 7/2008 | Webb et al. | |
| 7,419,190 B1 | 9/2008 | Atkinson et al. | |
| 7,434,846 B2 | 10/2008 | Baumgartner | |
| 7,445,249 B2 | 11/2008 | Feger et al. | |
| 7,455,330 B2 | 11/2008 | Baumgartner | |
| 7,464,970 B2 | 12/2008 | Yamada et al. | |
| 7,469,880 B2 | 12/2008 | Green et al. | |
| 7,469,936 B2 | 12/2008 | Norman | |
| 7,497,480 B2 | 3/2009 | Kerin et al. | |
| 7,523,966 B2 | 4/2009 | O'Neill et al. | |
| 7,527,303 B2 | 5/2009 | Furuya | |
| 7,530,605 B2 | 5/2009 | Rigollet et al. | |
| 7,644,958 B2 | 1/2010 | Postler | |
| 7,651,138 B2 | 1/2010 | Feger et al. | |
| 7,686,349 B2 | 3/2010 | Guest | |
| 7,726,700 B2 | 6/2010 | Norman | |
| 7,810,850 B2 | 10/2010 | O'Neill et al. | |
| 7,823,930 B2 | 11/2010 | Feger et al. | |
| 7,841,630 B1 | 11/2010 | Auray et al. | |
| 2007/0075542 A1 | 4/2007 | Glaze et al. | |
| 2007/0241562 A1 | 10/2007 | O'Neill et al. | |
| 2008/0238088 A1 | 10/2008 | Webb | |
| 2008/0238096 A1 | 10/2008 | Kees Ulrich et al. | |
| 2009/0001712 A1 | 1/2009 | Webb et al. | |
| 2009/0194990 A1 | 8/2009 | Williams | |
| 2009/0243288 A1 | 10/2009 | O'Neill et al. | |
| 2010/0052313 A1 * | 3/2010 | Ishida et al. | 285/93 |
| 2011/0088790 A1 | 4/2011 | Schutte | |
| 2011/0089681 A1 | 4/2011 | Schutte | |
| 2011/0089684 A1 | 4/2011 | Schutte | |
| 2012/0068454 A1 * | 3/2012 | Hamaguchi et al. | 285/93 |

FOREIGN PATENT DOCUMENTS

| | | |
|---|---|---|
| EP | 0528079 A1 | 2/1993 |
| EP | 0745801 A1 | 12/1996 |
| EP | 0794378 | 10/1997 |
| GB | 658366 | 10/1951 |
| JP | 2005106311 | 11/2005 |
| WO | 03/089827 | 10/2003 |
| WO | 2011049860 A1 | 4/2011 |

OTHER PUBLICATIONS

Search Report and Written Opinion mailed on Jan. 14, 2011 for PCT/US2010/052999.
Search Report and Written Opinion mailed on Jan. 24, 2011 for PCT/US2010/0530004.
Notification Concerning Transmittal of International Preliminary Report on Patentability for PCT/US2010/053029 dated May 3, 2012.

* cited by examiner

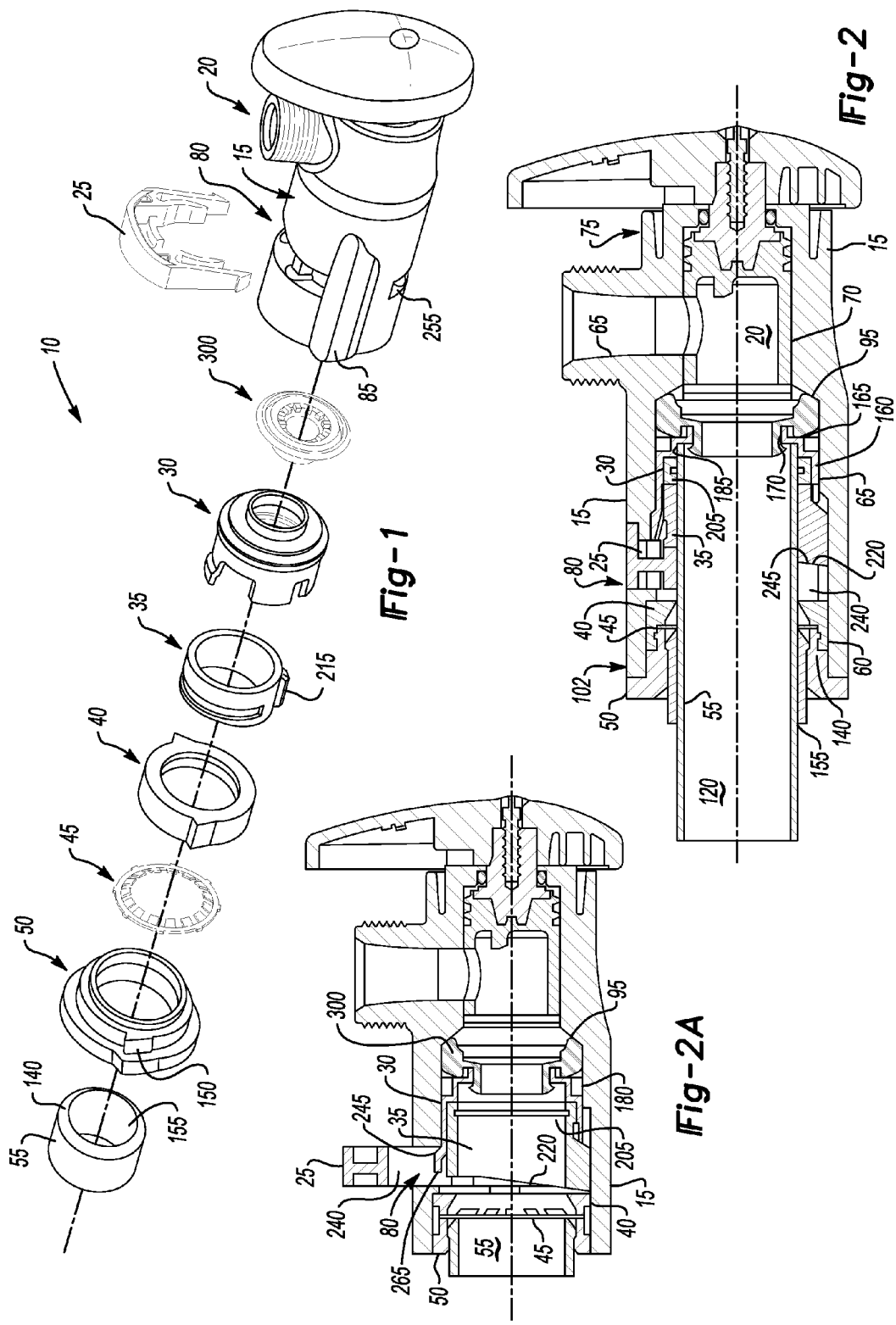

SUPPLY STOP WITH CONNECTION VERIFICATION

REFERENCE TO RELATED APPLICATIONS

This application is a continuation-in-part of U.S. Ser. No. 12/603,121, which was filed on Oct. 21, 2009. Cross reference is made to co-pending U.S. patent application Ser. No. 12/603,161, filed on Oct. 21, 2009, entitled "SUPPLY STOP WITH CONNECTION VERIFICATION" and U.S. patent application Ser. No. 12/603,142, filed on Oct. 21, 2009, entitled "ANTI-ROTATION GRIPPER RING".

BACKGROUND

Snap-fit or quick connectors are employed in a wide range of applications including automotive and industrial applications, among others. Such quick connectors utilize retainers or locking elements for securing one connector component, such as a tubular conduit, within a complimentary bore of another connector component or body. These retainers are typically of the axially-displaceable or radially-displaceable type. The terms "axially-displaceable" or "radially-displaceable" are taken relative to the axial bore through a female component.

In a typical quick connector with an axially displaceable retainer, the retainer is mounted within a bore in a body of one connector component. The retainer has a plurality of radially and angularly extending legs that extend inwardly toward the axial center line of the bore in the body. A tube to be sealingly mounted in the bore in one component includes an outwardly extending portion or a flange that abuts an inner peripheral surface of the retainer legs. Seal and spacer members as well as a bearing or top hat are typically mounted in the bore ahead of the retainer to form a seal between the body and the component if the component is lockingly engaged with the retainer legs in the body.

Radially displaceable retainers are also known in which the retainer is radially displaceable through aligned bores or apertures formed transversely to the main through bore in the body. The radially displaceable retainer is typically provided with a pair of depending legs that are sized and positioned to slip behind the outwardly extending portion or flange on the tube only when the tube is fully seated in the bore in the body. This ensures a positive locking engagement of the tube with the body as well as providing an indication that the tube is fully seated since the radially displaceable retainer can be fully inserted into the body only when the tube has been fully inserted into the bore in the body.

Other quick connectors utilize retainers designed to lockingly engage beadless endforms. One type of such retainers forms an annular clip with a plurality of radially inward extending, flexible fingers, that engage the endform at an angle to resist pullout of the endform from the connector body. Another type has a radially inward projection which engages a recess in the endform.

SUMMARY

According to an embodiment disclosed herein, an apparatus for assembling or disassembling a pipe in a pipe holder, includes: a washer having a body having an annular portion and an extended portion having central bore passing therethrough, the body made of a memory material; a compression fitting for insertion into the pipe holder, the extended portion fitting in the compression fitting; and, a lock for insertion into the pipe holder. The lock is for moving the compression fitting to deform the annular portion against the holder if inserted to form a seal between the pipe, the compression fitting and the holder. The lock also is for allowing the annular portion to reform and move against the holder if the lock is removed such that the compression fitting may be removed if the lock is removed.

According to a further embodiment disclosed herein, a washer for use in assembling or disassembling a pipe in a pipe holder in conjunction with a compression fitting, and being used as a seal therein, is shown. The washer has a body made of a memory material, the body having a flange and a central bore extending axially along an axis extending through the bore from the flange. The central bore is for fitting in the compression fitting. The flange is for being compressed if the washer is driven into the holder and is for uncompressing after the washer is not driven into the holder such that the washer regains its form.

According to a still further embodiment disclosed herein, a method of assembling or disassembling a pipe in a pipe holder includes the steps of: providing a washer having a body having an annular portion and an extended portion having central bore passing therethrough, the body made of a memory material; inserting a compression fitting into the pipe holder; inserting the extended portion in the compression fitting; driving the compression fitting and the washer fitting against the pipe holder with a lock; to seal the pipe holder while deforming the annular portion; and locking the compression fitting and the washer from moving.

BRIEF DESCRIPTION OF THE DRAWINGS

FIG. 1 is a perspective, disassembled view of an embodiment of a supply stop.

FIG. 2 is an assembled, cutaway view of the supply stop of FIG. 1 in an installed position.

FIG. 2A is a, cutaway view of the supply stop of FIG. 2 in an un-installed position.

DESCRIPTION

Figure 3:
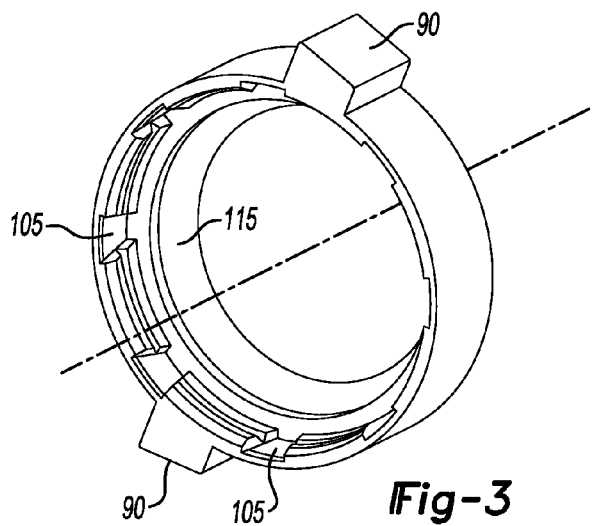
FIG. 3 is a perspective view of a retainer of FIG. 1.

Referring to FIGS. 1 and 2, a non-limiting embodiment of a supply stop 10 is shown. The embodiment has a body 15, a valve portion 20, a verification clip 25, a spring/washer 300, a verification cartridge 30, a compression ring 35, a backer ring 40, a gripper ring 45, a retainer 50 and a collet 55. The supply stop may also be described as a pipe joint assembly.

Figure 8:
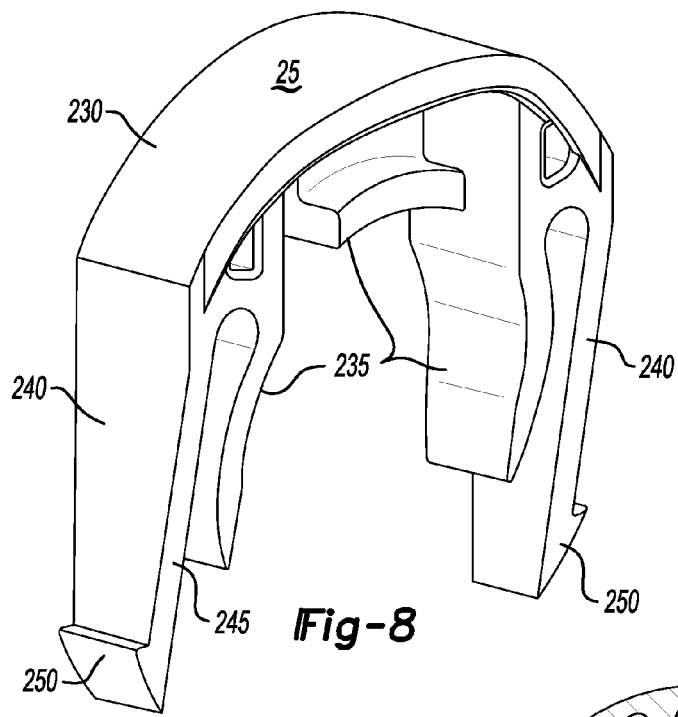
FIG. 8 is a perspective view of a verification clip of FIG. 1.
Figure 8A:
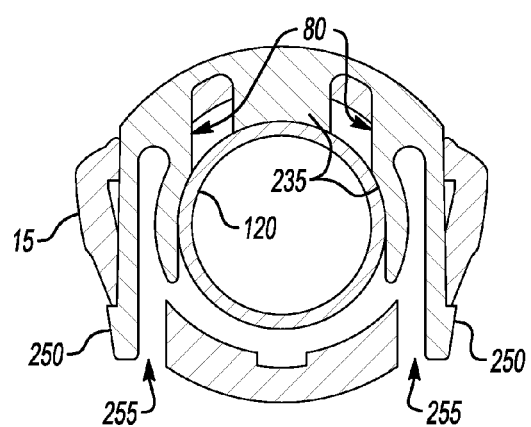
FIG. 8A is an end schematic view of an assembled verification clip seated in a body of FIG. 1.

A body 15 has as a main inlet bore 60, an outlet bore 65, a minor bore 70 in which the valve portion 20 is disposed, and a handle assembly 75. The body further has a semicircular opening 80 (see also FIG. 8A) in which the verification clip 25 may be inserted as will be discussed herein. The body 15 also has a pair of outboard openings 85 (see also FIG. 5) extending from the main bore 60 into which ears 90 extending from the backer ring 40 are inserted (see also FIG. 5) as will be discussed herein below.

The body 15 has a chamfered surface 95 that extends from the main bore 60 to the minor bore 70 to form an interference fit with the verification cartridge 30 and the spring/washer 300 as will also be discussed herein below.

Referring to FIGS. 2-5, the collet 55, the retainer 50 and gripper ring 45, the backer ring 40 form an assembly 100 in the body 15.

In FIG. 3, the backer ring 40 is shown having a plurality of indentations 105 and an inner wall 110, and a flange 115 backing the indentations depending inwardly therefrom. The flange 115 has approximately the same inner diameter as a pipe 120 (see FIGS. 2 and 5) that might be passed therethrough to provide fluid through the inlet bore 60 to the valve portion 20. An outer surface 125 of the backer ring 40 has a pair of ears 90 that fit into a pair of outboard openings 85 (see also FIG. 5) in the body 15.

Figure 4:
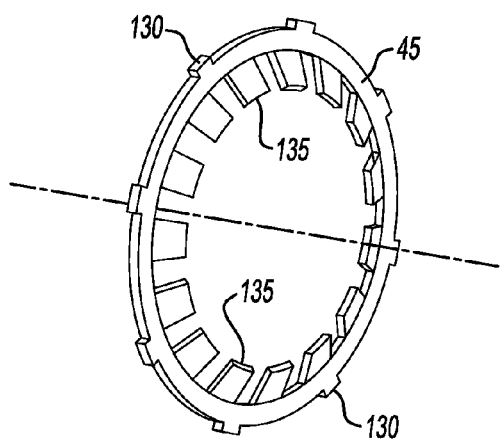
FIG. 4 is a perspective view of a gripper ring of FIG. 1.

As shown in FIG. 4, the gripper ring 45 has a plurality of outwardly depending fingers 130 that mate with the indentations 105 in the backer ring 40. The gripper ring 45 also has a plurality of teeth 135 that extend within the inner bore 60 of the body 15 through which the pipe 120 extends and form an interference fit with the pipe when the pipe is inserted through the gripper ring 45. The teeth 135 extend in the direction the pipe 120 is inserted into the body 15 so that attempts to remove the pipe from within the body are opposed by the teeth 130 that dig into the pipe 120 during such an attempt. The teeth 130 also oppose rotation of the gripper ring 45 about the pipe 120.

Figure 5:
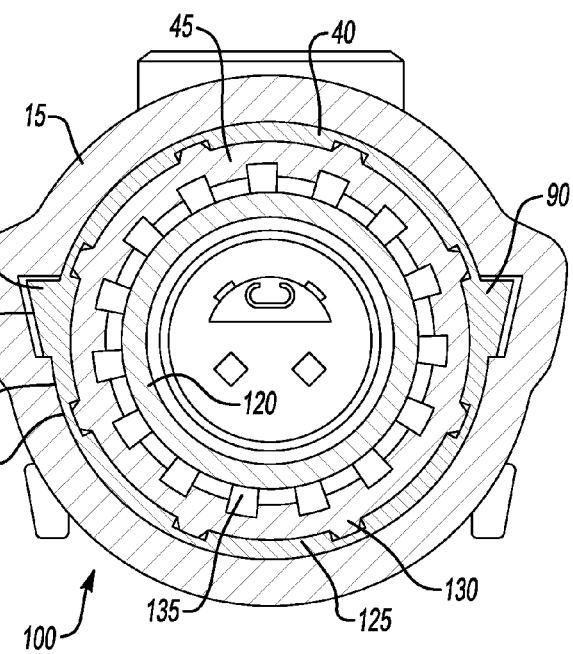
FIG. 5 is a perspective, end view of an assembled retainer, gripper ring and body of FIG. 1.

As shown in FIG. 5, the ears 90 of the backer ring 40 are inserted into the outboard openings 85 in the body 15 thereby preventing the backer ring 40 from any rotation therein. Further, the outwardly extending fingers 130 of the gripper ring 45 fit within the indentations 105 in the backer ring 40 thereby preventing the gripper ring 45 from rotating within the backer ring 40.

Referring to FIGS. 2 and 2A, after insertion of the insertion of the backer ring 40, the gripper ring 45, the collet 55 is inserted into the retainer 50. An outward extension 140 of the collet 55 gets hung up on an interior shoulder of the retainer 50. The retainer 50, similar to the backer ring 40, has a pair of ears 150 for insertion into the outboard openings 85 in the body 15 body to seal the body and prevent leakage therefrom. The retainer 50 also serves to hold the gripper ring 45 within the extension 105 in the backer ring 40. The collet, the retainer 50, and the backer ring 40 in the body 15, may be constructed of a similar material, such as a plastic or polymer, that may be sonically welded or the like together. A sonic weld provides a strong bond and helps minimize leaks through the end of the body 15. The collet 55 has an inner diameter 155 that approximates the diameter of the pipe 120 through the collet and assist in guiding the pipe into the body for positive retainment therein.

Figure 6:
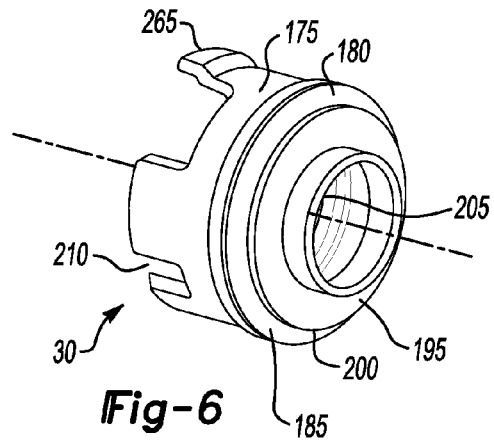
FIG. 6 is a perspective view of a verification cartridge of FIG. 1.
Figure 7:
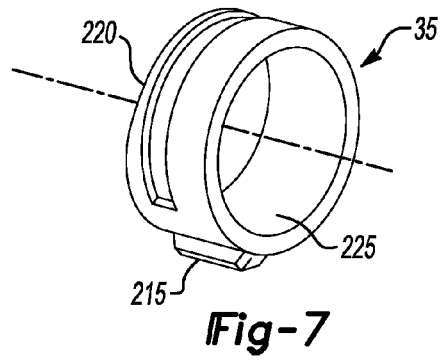
FIG. 7 is a perspective view of a compression ring of FIG. 1.

Referring now to FIGS. 2 and 6, verification cartridge 30 is shown. The verification cartridge has a first interior diameter 160, a second interior diameter 165 and a third interior diameter 170. The first interior diameter 160 is designed to hold the compression ring 35, the second interior diameter 165, is designed to hold an end of the pipe 120 to be inserted therein, and the third interior diameter 170 forms a passageway through which receives a cylindrical bore 305 of the spring/washer 300 (see FIGS. 9 and 11) through which fluid flows to the valve portion 20. The spring/washer 300 interacts with chamfered surface 95 in the body 15 as will be discussed infra. The first inner diameter 160 has a seal 205 disposed thereon a juncture between the second inner diameter 165 and the first inner diameter 160. Interference tab 265 helps prevent insertion of verification clip 25 if the verification cartridge and compression ring are not properly in position as will be discussed herein below.

The seal 205 disposed in the verification clip may be co-injection molded with the body of the verification clip 30. The seal 205 is not designed to have an interference fit initially with the pipe 120 that passes therethrough, as will be discussed herein. The verification cartridge has a groove 210 therein for receiving a position tab within the compression ring, as will be discussed herein.

Referring now to FIGS. 1, 2, 2A and 7, the compression ring 35 has a location tab 215 cooperating with the groove 210 of the verification cartridge. The compression ring has a chamfered surface 220 that cooperates with the verification clip 25, as will be discussed herein. The compression ring also has an interior bore 225 through which a pipe extends therethrough.

Referring now to FIGS. 1, 2, 8 and 8A, the verification clip 25 and its relationship to the body 15 of the supply stop 10 is shown. The verification clip 25 has an upper arcuate portion 230 that conforms to the shape of the exterior of the body 15 if inserted therein, a plurality of arcuate engagement members 235 for engaging the pipe 120, and two legs 240. Each leg is flexible, has an angled side 245 that is designed to engage the chamfered surface 220 of the compression ring 35 to move axially towards the verification cartridge 30 and a pair of snap tabs 250 at the ends of the legs. Each of the snap tabs 250 is designed to fit within openings 255 in the body 15. The flexibility of each of the legs 240 causes the legs to create a signal such as an audible click to be heard when the snap tabs 250 are released to extend beyond the body 15 when encountering opening 255 after being flexed inwardly to be inserted into the body 15.

Figure 9:
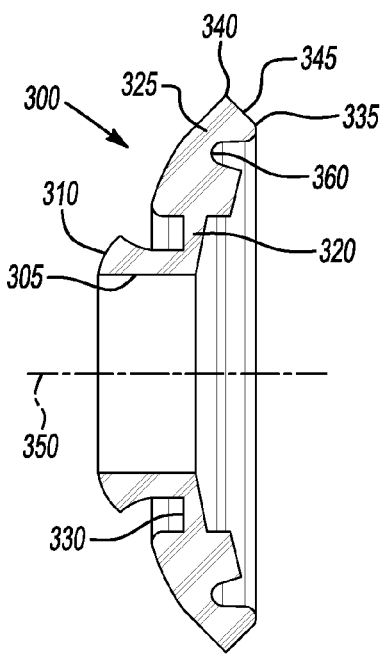
FIG. 9 is a side perspective view of a spring/washer used in the supply stop of FIG. 1.
Figure 10:
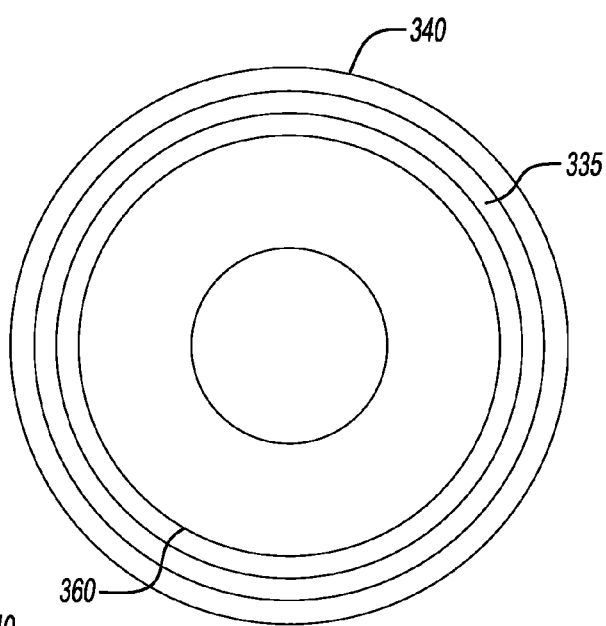
FIG. 10 is front view of the spring/washer of FIG. 9.
Figure 11:
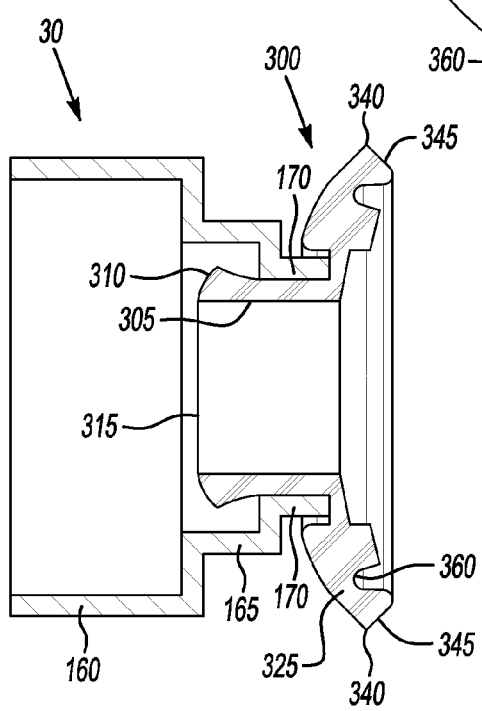
FIG. 11 is a side view of the spring/washer of FIG. 9 partially assembled.

Referring now to FIGS. 9, 10 and 11, the spring/washer 300 and the verification cartridge 30 are shown. The spring/washer 300 has a cylindrical bore 305 having a bead 310 extending around an end 315 of the bore 305. The bead extends beyond the third interior diameter 170 to hold the spring/washer in the verification cartridge 30 during preassembly. The spring/washer 300 has an annular neck 320 extending outwardly from the bore 305 to an annular body 325 that arcs away from the bore 305. The annular body 325 and the neck 320 form a first groove 330 for receiving the third interior diameter 170 of the verification cartridge 30. The annular body 325 has an annular ridge 335 disposed inwardly of an outer apex 340. A portion 345 angles towards axis 350 at a 45 degree angle. A second groove 360 is disposed between in the annular body 325 adjacent the annular ridge 335. If the portion 345 engages the chamfered surface 195, the annular body 335 closes the second groove 360. The spring/washer 300 is made of an elastomer or a rubber or other flexible/malleable/compressible material that has memory.

Prior to assembly of the supply stop 10, the bore 305 of the spring/washer 300 is placed within the third interior diameter 170 of the verification cartridge 30 until the bead 310 extends through the third interior diameter 170 thereby anchoring the spring/washer 300 to the verification cartridge 30.

Referring to FIG. 2A, to assemble the supply stop 10, the verification cartridge 30 and the attached spring/washer is inserted into the body 15 before the compression ring 35.

The fingers 130 of the gripper ring 45 are then inserted into the indentations 105 of the backer ring 40 so that the gripper ring does not rotate within the backer ring. The ears 90 of the backer ring 40 are inserted into the outboard openings 85 of the body 15 so that the backer ring and the gripper ring inserted in the backer ring do not rotate within the body. The collet is inserted into the retainer. Then the collet and retainer are inserted into the body 15. The collet 55, the retainer 50, the gripper ring 45, the backer ring 40 are all then sonically welded (or glued or the like) together and to the body 15. The verification cartridge 30 and the compression ring 35 are still free to move axially within the body 15. Note that exterior flange 195 is unbent and does not contact the chamfered surface 95 of the body 15. Note also that verification clip 25 is blocked from insertion into opening 80 by interference tab 265 on the verification cartridge 30 and by compression ring 35. The angled surface 245 of the legs 240 of the verification clip 25 do not reach the chamfered surface 220 of the compression ring 35 to move the compression ring towards the valve portion 20.

Referring now to FIG. 2, a pipe 120 is inserted into the body 15 through the collet 55, the compression ring 35 and the verification cartridge 30. While being inserted, an end 260 of the pipe 120 enters the second portion 165 of a reduced diameter within the verification cartridge and pushes the verification cartridge and the spring/washer 300 towards the valve portion 20 such that the portion 345 of the spring/washer 300 engages the chamfered surface 95 of the body 15 and bends forward towards the body 15. The compression ring 35 is disposed at this time within the verification cartridge 30. The second groove is closed by the spring/washer 300 annular body 325 thereby forming a seal to minimize leakage therefrom. The annular body 325 is compressed by such motion and will spring back if the compression of the compression ring is removed.

Because the interference tab 265 and the compression ring 35 are moved axially by insertion of the pipe 120, a user may then insert the verification clip 25 within the opening 80 within the body 15. The angled surfaces 245 of the legs 240 then have access to and engage the chamfered surface 220 of the compression ring 35, the surfaces cooperating thereby to drive the compression ring axially towards the valve portion 20. As the compression rings moves, the seal 205 of the verification cartridge is compressed by contact with the compression ring and the inner seal then makes contact with the pipe 120 providing sealing thereby. As the verification clip continues to move, its legs 240 extend beyond the body 15 through opening 255 and an audible click may be heard signaling to a user that installation is complete.

If the verification clip 25 is not fully inserted, the compression ring 35 will not compress the inner seal 215 properly and leakage will be detected if the water is turned on. Furthermore, if the compression ring 35 does not move far enough axially, because the pipe 120 is not inserted far enough, the legs 240 of the verification clip 25 will not move far enough in cooperation with the chamfered surface 220 of the compression ring 35 to provide an audible click.

The spring/washer 300 attached to the verification cartridge 30 provides two functions. First, if the pipe 120 is not inserted far enough into the body 15 (or not at all), the spring/washer 300 is flexible enough so that it pushes the verification cartridge 30, and the compression ring 35 thereby, back towards the backer ring 40 thereby minimizing a probability that a user can insert the verification clip 25 far enough into the body 25 to believe the pipe 120 is properly installed. Secondly, if the supply stop has to be removed, reused or adjusted, after the verification clip is removed, the spring/washer 300 reacts against the chamfered surface 95 of the body to push the verification cartridge and compression ring back towards the backer ring 40 so they can be accessed, adjusted or reused.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

We claim:

1. An apparatus for assembling or disassembling a pipe in a pipe holder, said apparatus comprising:
   a washer having a body having an annular portion and an extended portion having a central bore passing therethrough, said body made of a memory material,
   a verification cartridge received within said pipe holder, said extended portion fitting in said verification cartridge,
   a compression ring received within said verification cartridge, and
   a lock configured to be inserted into said pipe holder, said lock moving said compression ring to deform said annular portion against said holder when inserted to form a seal between the pipe, the compression ring and the holder, and allowing said annular portion to reform and move against said holder when said lock is removed such that said compression ring may be removed when said lock is removed.

2. The apparatus of claim 1 wherein a first groove is formed between said extended portion and said annular portion to receive said verification cartridge.

3. The apparatus of claim 2 wherein said body has an annular second groove disposed in said annular portion allowing said annular portion to deform therein.

4. The apparatus of claim 1 wherein said extended portion has a bead for locking said washer to said verification cartridge.

5. The apparatus of claim 1 wherein said annular portion has an apex for contacting a bore of said holder and an angled portion for engaging a chamfered portion of said holder.

6. The apparatus of claim 5 wherein said angled portion is disposed at about 45 degrees to an axis passing through said bore.

7. The apparatus of claim 1 wherein a neck connects said extended portion and said annular portion of said body.

8. A washer for use in assembling or disassembling a pipe in a pipe holder in conjunction with a compression ring received within a verification cartridge, and being used as a seal therein, said washer comprising:
   a body made of a memory material and which has a flange and a central bore extending axially along an axis extending through said central bore from said flange, said central bore for fitting in said verification cartridge, and
   said flange for being compressed when said washer is driven into said holder by said pipe and said flange uncompressing after said washer is not driven into said holder such that said washer regains its form.

9. The washer of claim 8 wherein a first groove is formed between said central bore and said flange to receive said verification cartridge.

10. The washer of claim 8 wherein said central bore has a bead for locking said washer to said verification cartridge.

11. The washer of claim 8 wherein said flange is arcuate.

12. The washer of claim 8 wherein said flange has an apex for contacting a bore of said holder and an angled portion for engaging a chamfered portion of said holder.

13. The washer of claim 12 wherein said angled portion is disposed at about 45 degrees to said axis passing through said central bore.

14. The washer of claim 8 wherein said body has an annular second groove in said flange allowing said annular portion to deform therein.

15. The washer of claim 8 wherein a neck connects said central bore and said flange of said washer.

16. A method of assembling or disassembling a pipe in a pipe holder, said method comprising:
   providing a washer having a body having an annular portion and an extended portion having central bore passing therethrough, said body made of a memory material,
   inserting a verification cartridge into said pipe holder,
   inserting said extended portion in said verification cartridge,
   inserting a compression ring into said verification cartridge,
   driving said compression ring and said washer against said pipe to seal said pipe holder while deforming said annular portion, and
   locking said compression ring and said washer from moving.

17. The method of claim 16 further comprising the steps of:
   unlocking said compression ring and said washer, and
   allowing said annular portion to reform while driving said compression ring and said washer away from said pipe holder.

18. The method of claim 16 further comprising the step of:
   deforming the annular portion about a groove disposed on a surface thereof.

19. The apparatus of claim 5 wherein said angled portion extends at an oblique angle relative to a center axis defined by said central bore.

20. The apparatus of claim 19 wherein said chamfered portion extends at an oblique angle relative to said center axis.

21. The apparatus of claim 1 wherein an end of said pipe is received within said compression ring and said verification cartridge.

22. The apparatus of claim 1 wherein an end of said pipe is received within said holder such that said pipe axially moves said verification cartridge and said washer until said washer engages a bore surface of said holder.

23. The apparatus of claim 22 wherein the verification cartridge includes at least one seal, and wherein the lock is inserted to axially move the compression ring to compress the at least one seal.

24. The washer of claim 12 wherein said angled portion extends at an oblique angle relative to a center axis defined by said central bore, and wherein said chamfered portion extends at an oblique angle relative to said center axis.

25. The washer of claim 8 wherein an end of said pipe is configured to be received within said compression ring and said verification cartridge.

26. The washer of claim 8 wherein an end of said pipe is received within said holder such that said pipe axially moves said verification cartridge and said washer until said washer engages a bore surface of said holder.

27. The washer of claim 26 wherein the verification cartridge includes at least one seal, and wherein a clip is inserted into an opening in the holder to axially move the compression ring to compress the at least one seal.

28. The method of claim 16 further comprising the step of:
   providing said annular portion with an apex for contacting a bore of said holder and an angled portion, and
   engaging the angled portion against a chamfered portion of said holder.

29. The method of claim 28 further comprising the steps of:
   extending said angled portion extends at an oblique angle relative to a center axis defined by said central bore, and
   extending said chamfered portion at an oblique angle relative to said center axis.

30. The method of claim 16 further comprising the step of:
   inserting an end of said pipe within said compression ring and said verification cartridge.

31. The method of claim 30 further comprising the step of:
   inserting the end of said pipe within said holder such that said pipe axially moves said verification cartridge and said washer until said washer engages a bore surface of said holder.

32. The method of claim 31 wherein the verification cartridge includes at least one seal, and wherein the method further comprises the step of:
   inserting a clip into an opening in the holder to axially move the compression ring to compress the at least one seal.

* * * * *